Patented Oct. 21, 1941

2,260,184

UNITED STATES PATENT OFFICE 2,260,184

3-HALOGENO-BIS-NOR-ALLO-CHOLANIC ACID COMPOUNDS AND A PROCESS FOR PRODUCING THEM

Russell Earl Marker, State College, Pa., assignor to Parke, Davis & Company, Detroit, Mich., a corporation of Michigan No Drawing. Original application August 6, 1937, Serial No. 157,775. Divided and this application September 26, 1938, Serial No. 231,817

7 Claims. (Cl. 260—397.1)

The invention relates to 3-halogeno-bis-nor-allo-cholanic acid and its esters, and to the processes for obtaining compounds of this group.

This application is a division of my copending application, Serial No. 157,775, filed August 6, 1937.

The compounds of the present invention may be synthesized from the esters of 3-chloro-nor-allo-cholanic acid, particularly the methyl ester thereof. The chemical transformations involved are illustrated in the following diagram:

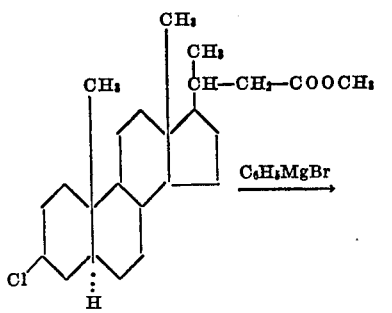

Methyl ester of 3-chloro-allo-nor-cholanic acid (M. P. 178° C.)

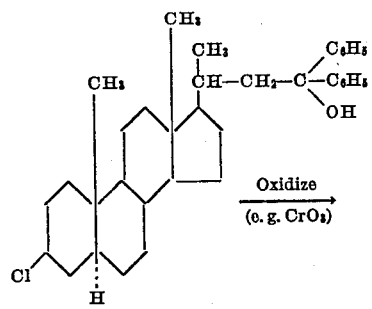

3-chloro-allo-bis-nor-cholanyl-diphenyl carbinol (M. P. 183° C.)

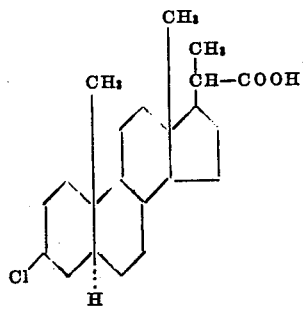

3-chloro-bis-nor-allo-cholanic acid (231° C.)

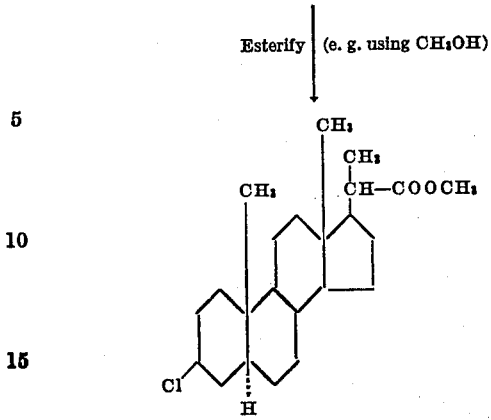

Methyl ester of 3-chloro-bis-nor-allo-cholanic acid (M. P. 151° C.)

The methyl ester of 3-chloro-nor-allo-cholanic acid has a melting point of 178° C. It may be obtained in accordance with any known process. In the parent application, above referred to, the steps of obtaining the same from 3-chloro-allo-cholanic acid are given and these are also set forth in the following examples. Examples are also subsequently given of the steps in the conversion of the methyl ester of 3-chloro-nor-allo-cholanic acid into the esters of 3-chloro-bis-nor-allo-cholanic acid.

It is to be understood that while the chloro derivatives are described in detail, the other halogeno derivatives are included within the scope of the invention as the steps in obtaining the other halogeno compounds are similar to those specifically set forth.

*Preparation of 3-chloro-allo-cholanic acid*

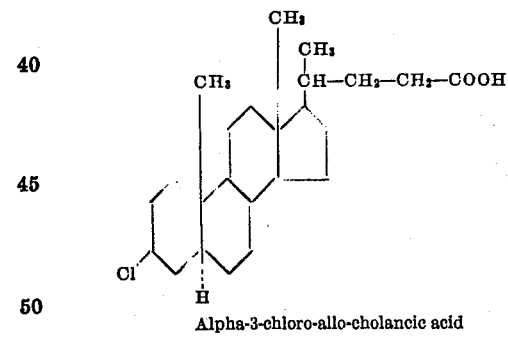

Alpha-3-chloro-allo-cholancic acid

This compound is prepared from the ring-saturated sterol halide, alpha-cholestyl chloride, by chromic oxide oxidation as described by Marker, Whitmor and Kamm, J. A. C. S., volume 57, pages 2358-60, December, 1935. It crystallizes from acetone and has a melting point of 180° C.

*Preparation of the methyl ester of 3-chloro-allo-cholanic acid*

15 cc. of concentrated sulfuric acid is added to a solution of 100 grams of 3-chloro-allo-cholanic acid, m. pt. 180° C., in 3 liters of methyl alcohol. The solution is refluxed for 2 hours with distillation of the alcohol in the meantime to a volume of about 500 cc. The solution is cooled to obtain a crystalline product which is then recrystallized from methyl alcohol and shows a melting point of 133° C.

Anal. Calcd. for $C_{25}H_{41}O_2Cl$: C, 73.2; H, 10.1. Found: C, 72.8; H, 10.3.

*Preparation of 3-chloro-allo-nor-cholanyl-diphenylcarbinol*

A solution of 27 grams of methyl-3-chloro-allo-cholanate in 800 cc. of ether is added over a period of one hour to a stirred and gently refluxing solution of 0.27 mole of phenyl magnesium bromide in 600 cc. of ether. The solution is stirred and refluxed for 4 hours, after which the ether is distilled off until the temperature of the remaining solution reaches 40° C. Most of the solids dissolve at this point to form a clear solution. The solution is maintained at 40° for one hour, decomposed with 1 liter of dilute sulfuric acid and extracted with ether. The ether solution is washed with water and concentrated to 200 cc. 200 cc. of methyl alcohol is added to the concentrated ether solution and the resulting solution is further concentrated to 250 cc. When this solution is cooled and shaken, the carbinol crystallizes out as a white solid. This is recrystallized from methyl alcohol and then has a melting point of 171° C.

Anal. Calcd. for $C_{36}H_{49}OCl$: C, 81.1; H, 9.2. Found: C, 81.1; H, 9.3.

*Preparation of 3-chloro-nor-allo-cholanic acid*

A solution of 14.3 grams of chromic oxide in 140 cc. of 90% acetic acid is added over a period of 25 minutes to a solution of 19 grams of 3-chloro-nor-allo-cholanyl diphenylcarbinol in 375 cc. of glacial acetic acid at 90°. The solution is stirred an additional 3 hours at 90°, cooled to room temperature and 1800 cc. of 10% hydrochloric acid is added slowly with shaking. The mixture is allowed to stand overnight and filtered. The solid which is filtered off is stirred with 100 cc. of boiling methanol, cooled and filtered. The solid is then washed with cold methanol, leaving a crystalline product free of benzophenone. This is recrystallized from methanol and shows a melting point of 248° C. The yield is 10.5 grams of crystals.

Analysis. Calculated for $C_{23}H_{37}O_2Cl$: C, 72.5; H, 9.8. Found: C, 72.8; H, 9.6.

*Preparation of the methyl ester of 3-chloro-nor-allo-cholanic acid*

The compound is prepared by a method analogous to that used in making the methyl ester of 3-chloro-allo-cholanic acid described above. The melting point for the product is found to be 178° C.

Anal. Calcd. for $C_{24}H_{39}O_2Cl$: C, 73.0; H, 10.0. Found: C, 73.3; H, 10.2.

*Preparation of 3-chloro-allo-bis-nor-cholanyl-diphenylcarbinol*

A solution of 27 grams of methyl-3-chloro-allo-nor-cholanate in 800 cc. of ether is added over a period of one hour to a stirred and gently refluxing solution of 0.27 mole of phenyl magnesium bromide in 600 cc. of ether. The solution is stirred and refluxed for 4 hours, after which the ether is distilled off until the temperature of the remaining solution reaches 40° C. Most of the solids dissolve at this point to form a clear solution. The solution is maintained at 40° for one hour, decomposed with 1 liter of dilute sulfuric acid and extracted with ether. The ether solution is washed with water and concentrated to 200 cc. 200 cc. of methyl alcohol is added to the concentrated ether solution and the resulting solution is further concentrated to 250 cc. When this solution is cooled and shaken, the carbinol crystallizes out as a white solid. This is recrystallized from methyl alcohol and then has a melting point of 183° C.

*Preparation of 3-chloro-bis-nor-allo-cholanic acid*

A solution of 14.3 grams of chromic oxide in 140 cc. of 90% acetic acid is added over a period of 25 minutes to a solution of 19 grams of 3-chloro-allo-bis-nor-cholanyl diphenylcarbinol in 375 cc. of glacial acetic acid at 90°. The solution is stirred an additional 3 hours at 90°, cooled to room temperature and 1800 cc. of 10% hydrochloric acid is added slowly with shaking. The mixture is allowed to stand overnight and filtered. The solid which is filtered off is stirred with 100 cc. of boiling methanol, cooled and filtered. The solid is then washed with cold methanol, leaving a crystalline product free of benzophenone. This is recrystallized from methanol and shows a melting point of 231° C.

*Preparation of the methyl ester of 3-chloro-bis-nor-allo-cholanic acid*

15 cc. of concentrated sulfuric acid is added to a solution of 100 grams of 3-chloro-bis-nor-allo-cholanic acid, m. pt. 231° C., in 3 liters of methyl alcohol. The solution is refluxed for 2 hours with distillation of the alcohol in the meantime to a volume of about 500 cc. The solution is cooled to obtain a crystalline product which is then recrystallized from methyl alcohol and shows a melting point of 151° C.

*Other esters of 3-chloro-bis-nor allo-cholanic acid*

In the preceding example, the methyl ester of 3-chloro-bis-nor-allo-cholanic acid was described. Other esters may be obtained by the same process by replacing the methyl alcohol with other alcohols such as ethyl, propyl and butyl alcohols. The corresponding ethyl, propyl and butyl esters of 3-chloro-bis-nor-allo-cholanic acid are thereby obtained.

As previously stated, the compounds of the invention are not limited to the chloro derivatives but the invention includes other halogeno derivatives. Thus the broad class of compounds embraced within the present invention may be termed 3-halogeno-bis-nor-allo-cholanic acid and its esters.

What I claim as my invention is:

1. The process of preparing esters of 3-halogeno-bis-nor-allo-cholanic acid which comprises reaction of an ester of 3-halogeno-allo-nor-cholanic acid with phenyl magnesium bromide to obtain 3-halogeno-allo-bis-nor-cholanyl-diphenylcarbinol, oxidizing the latter compound to obtain 3-halogeno-bis-nor-allo-cholanic acid, and esterifying the last named compound to obtain an ester of 3-halogeno-bis-nor-allo-cholanic acid.

2. A 3-chloro-bis-nor-allo-cholanic acid.

3. A 3-halogeno-bis-nor-allo-cholanic acid.

4. A compound of the group consisting of a 3-halogeno-bis-nor-allo-cholanic acid and its esters.

5. 3-chloro-bis-nor-allo-cholanic acid having a melting point of 231° C.

6. The methyl ester of 3-chloro-bis-nor-allo-cholanic acid having a melting point of 151° C.

7. The process of preparing esters of 3-chloro-bis-nor-allo-cholanic acid which comprises reaction of an ester of 3-chloro-allo-nor-cholanic acid with phenyl magnesium bromide to obtain 3-chloro-allo-bis-nor-cholanyl-diphenylcarbinol, oxidizing the latter compound to obtain 3-chloro-bis-nor-allo-cholanic acid, and esterifying the last named compound to obtain an ester of 3-chloro-bis-nor-allo-cholanic acid.

RUSSELL EARL MARKER.